(12) United States Patent
Sørensen et al.

(10) Patent No.: US 12,000,377 B2
(45) Date of Patent: Jun. 4, 2024

(54) METHOD FOR ERECTING A WIND TURBINE TOWER USING STUD BOLTS

(71) Applicant: Vestas Wind Systems A/S, Aarhus N. (DK)

(72) Inventors: Jakob Anders Sørensen, Fredericia (DK); Christine Broe, Aarhus C (DK); Rasmus Sanderhoff Johansen, Hørning (DK)

(73) Assignee: Vestas Wind Systems A/S, Aarhus (DK)

( * ) Notice: Subject to any disclaimer, the term of this patent is extended or adjusted under 35 U.S.C. 154(b) by 125 days.

(21) Appl. No.: 17/611,939

(22) PCT Filed: May 19, 2020

(86) PCT No.: PCT/DK2020/050143
§ 371 (c)(1),
(2) Date: Nov. 17, 2021

(87) PCT Pub. No.: WO2020/233762
PCT Pub. Date: Nov. 26, 2020

(65) Prior Publication Data
US 2022/0228565 A1  Jul. 21, 2022

(30) Foreign Application Priority Data
May 21, 2019  (DK) .......................... PA 2019 70317

(51) Int. Cl.
*F03D 13/20* (2016.01)
*B23P 19/06* (2006.01)
(Continued)

(52) U.S. Cl.
CPC ............ *F03D 13/20* (2016.05); *B23P 19/067* (2013.01); *E04H 12/085* (2013.01);
(Continued)

(58) Field of Classification Search
CPC ................ E04H 12/085; E04H 12/342; F05B 2260/301; B23P 19/067; B23P 19/06;
(Continued)

(56) References Cited

U.S. PATENT DOCUMENTS 1,298,324 A  3/1919  Funk
2,628,105 A  2/1953  McKean
(Continued)

FOREIGN PATENT DOCUMENTS

CN   101126284 A   2/2008
CN   101749199 A   6/2010
(Continued)

OTHER PUBLICATIONS

China National Intellectual Property Administration, Office Action issued in corresponding Chinese Patent Application No. 202080047028. 4. mailed Apr. 14, 2023.
(Continued)

*Primary Examiner* — Andrew J Triggs
(74) *Attorney, Agent, or Firm* — Wood Herron & Evans LLP (57) ABSTRACT

A method for erecting a wind turbine tower is disclosed. A tower section (8) comprising a lower flange (9) and an upper flange (10), and a plurality of stud bolts (6) and nuts (7) are provided. The tower section (8) is oriented in an upright position with the lower flange (9) below the upper flange (10), and stud bolts (6) are positioned in bolt holes (12) in the lower flange (9) with nuts (7) arranged on an upper side of the lower flange (9). The tower section (8) is lifted to a mounting position on top of another tower section (13), and a flange combination is formed by aligning the bolt holes (12) formed in the lower flange (9) of the tower section (8) with bolt holes (15) formed in an upper flange (14) of the other tower section (13), while advancing the stud bolts (6)
(Continued)

through the bolt holes (12, 15). The invention further provides a socket tool (16) for screwing nuts (7) onto stud bolts (6) in a manner which positions the stud bolts (6) correctly with respect to a flange (9).

12 Claims, 11 Drawing Sheets

(51) Int. Cl.
  *E04H 12/08* (2006.01)
  *E04H 12/34* (2006.01)
(52) U.S. Cl.
  CPC ...... *E04H 12/342* (2013.01); *F05B 2230/604* (2013.01); *F05B 2260/301* (2013.01)
(58) Field of Classification Search
  CPC ......... F03D 13/20; F03D 13/10; B25B 21/00; B25B 23/14
  See application file for complete search history.

(56) References Cited

U.S. PATENT DOCUMENTS

| | | | | |
|---|---|---|---|---|
| 3,636,568 A * | 1/1972 | Stuner | ................ | A41D 19/0065 294/25 |
| 8,322,757 B2 * | 12/2012 | Ma | ................ | E04H 12/28 285/412 |
| 8,763,469 B2 * | 7/2014 | Knoop | ................ | F03D 13/20 73/761 |
| 11,148,240 B2 * | 10/2021 | Hohmann | ................ | F03D 13/10 |
| 11,311,973 B2 * | 4/2022 | Hohmann | ................ | B25B 29/02 |
| 11,346,324 B2 * | 5/2022 | Johansen | ................ | F03D 13/20 |
| 11,603,822 B2 * | 3/2023 | Johansen | ................ | F03D 13/20 |
| 2010/0325986 A1 | 12/2010 | Maestre et al. | | |
| 2015/0082512 A1 * | 3/2015 | McGraw | ................ | A41D 19/0037 2/159 |
| 2017/0314285 A1 | 11/2017 | Dobrusky et al. | | |
| 2019/0161991 A1 * | 5/2019 | Mtauweg | ................ | F03D 13/20 |
| 2022/0219269 A1 * | 7/2022 | Johansen | ................ | F03D 13/10 |
| 2022/0228565 A1 * | 7/2022 | Sørensen | ................ | F03D 13/10 |

FOREIGN PATENT DOCUMENTS

| | | |
|---|---|---|
| DE | 20311591 U1 | 10/2003 |
| EP | 2541047 A2 | 1/2013 |
| EP | 2798134 A1 | 11/2014 |
| ES | 2600978 A1 | 2/2017 |
| WO | 2007059768 A1 | 5/2007 |
| WO | 2009156039 A2 | 12/2009 |
| WO | 2018019832 A1 | 2/2018 |

OTHER PUBLICATIONS

Danish Patent and Trademark Office, Search and Examination Report in PA 2019 70317, Nov. 20, 2019.

European Patent Office, International Search Report and Written Opinion in PCT Application No. PCT/DK2020/050143, Jul. 27, 2020.

Intellectual Proprty of India, examination report issued in corresponding IN Application No. 202117058373, dated Aug. 22, 2023.

* cited by examiner

METHOD FOR ERECTING A WIND TURBINE TOWER USING STUD BOLTS

FIELD OF THE INVENTION

The present invention relates to a method for erecting a wind turbine tower, in which at least two tower sections are joined to each other via flanges formed on the tower sections. The invention further relates to a socket tool for screwing threaded nuts onto stud bolts during erection of a wind turbine tower.

BACKGROUND OF THE INVENTION

Wind turbine towers are often assembled from a number of cylindrical or conical tower sections being arranged one on top of another. In order to join two adjacent tower sections to each other, the tower sections are normally provided with flanges having bolt holes formed therein at their end parts. The flanges of two adjacent tower sections are arranged in abutment and joined to each other by means of a plurality of bolts inserted into the bolt holes. The bolts used for this are normally provided with an integrated bolt head formed at one end of an elongated shaft, and a threaded portion, arranged to receive a nut, formed at an opposite end of the elongated shaft.

The bolts may be lifted separately to the position of the abutting flanges after the uppermost tower section has been lifted into position. This requires at least one additional lifting operation by a crane, adding to the time required for erecting the wind turbine tower. The bolts may then be inserted into the bolt holes at this elevated position, i.e. a significant amount of handling of the heavy bolts takes place at the elevated position. Furthermore, since it is preferred to tension the bolts from above, the bolts need to be inserted from below in order to position the bolt head under the flange combination and the nut above the flange combination. This complicates the bolt handling.

In order to avoid the additional lifting operations, the bolts may be positioned in the bolt holes of lower flange of the tower section being positioned on top of another tower section while this tower section is still positioned on the ground. Thereby the bolts can be lifted to the elevated position along with the tower section. However, in order to retain the bolts in the bolt holes during the lifting, the bolts must be positioned with the bolt heads above the flange. Accordingly, each bolt needs to be removed from its bolt hole and reinserted into the bolt hole in a reversed manner, i.e. with the bolt head below the flange combination and the threaded portion above the flange combination, in order to allow the bolt to be tensioned from above. This is cumbersome and requires significant handling of the heavy bolts at the elevated position.

DESCRIPTION OF THE INVENTION

It is an object of embodiments of the invention to provide a method for erecting a wind turbine tower, in which handling of heavy objects at elevated positions is reduced as compared to prior art methods.

It is a further object of embodiments of the invention to provide a method for erecting a wind turbine tower, in which the number of lifting operations is reduced as compared to prior art methods.

It is an even further object of embodiments of the invention to provide a method for erecting a wind turbine tower, in which the time required for erecting the wind turbine tower is reduced as compared to prior art methods.

It is an even further object of embodiments of the invention to provide a tool for screwing nuts onto stud bolts in and easy and accurate manner.

According to a first aspect the invention provides a method for erecting a wind turbine tower, the method comprising the steps of:
providing a tower section comprising a lower flange and an upper flange, each flange being provided with a plurality of through-going bolt holes,
providing a plurality of stud bolts and a pair of nuts for each stud bolt,
mounting a nut to one end of each stud bolt,
orienting the tower section in an upright position with the lower flange below the upper flange,
positioning stud bolts in the plurality of bolt holes in the lower flange with the nuts arranged on an upper side of the lower flange,
lifting the tower section to a mounting position on top of another tower section,
forming a flange combination by aligning the through-going bolt holes formed in the lower flange of the tower section with through-going bolt holes formed in an upper flange of the other tower section, while advancing the stud bolts through the bolt holes,
mounting a nut on a lower part of each of the stud bolts, and
tensioning the stud bolts, thereby securing the tower section to the other tower section.

Thus, according to the first aspect the invention provides a method for erecting a wind turbine tower. The wind turbine tower being erected by means of the method is of the kind comprising two or more tower sections arranged one on top of another and joined to each other via flanges.

According to the method a tower section is initially provided. The tower section comprises a lower flange and an upper flange, i.e. flanges arranged at opposite ends of a substantially cylindrical or conical tower section. The flanges are each provided with a plurality of through-going bolt holes, i.e. holes extending through the respective flanges, and which are arranged to receive bolts therein.

Furthermore, a plurality of stud bolts and a pair of nuts for each stud bolt are provided. In the present context the term 'stud bolt' should be interpreted to mean a bolt which, unlike traditional bolts, is not provided with an integrated bolt head. Instead, the stud bolt is provided with threaded portions at both ends of the elongated shaft, and thereby the stud bolt is arranged to have a nut mounted on each end of the elongated shaft. A nut is then mounted to one end of each of the stud bolts.

Next, the tower section is oriented in an upright position with the lower flange below the upper flange. Thus, the tower section is oriented substantially in the manner which it will be when it eventually forms part of the erected wind turbine tower.

Stud bolts are then positioned in the plurality of bolt holes in the lower flange. The stud bolts are positioned in such a manner that the nuts, which were previously mounted to one end of each stud bolt, are arranged on an upper side of the lower flange. Thus, the nuts rest on the upper side of the lower flange, and thereby prevent the stud bolts from passing entirely through the bolt holes, i.e. the nuts retain the stud bolts in the bolt holes.

Next, the tower section, along with the stud bolts positioned in the bolt holes of the lower flange, is lifted to a mounting position on top of another tower section. Since the stud bolts are positioned with the nuts on the upper side of the lower flange, as described above, they are retained relative to the lower flange during this lifting operation. Accordingly, the tower section and all bolts required for joining the tower section to another tower section are lifted in one lifting operation.

Once the tower section has been lifted to the mounting position as described above, a flange combination is formed from the lower flange of the tower section and the upper flange of the other tower section which is already in position. The flange combination is further formed by aligning the through-going bolt holes formed in the two flanges and by advancing the stud bolts through the aligned bolt holes. The aligning of the bolt holes may be performed using aligning pins or similar equipment.

Thus, at this point the lower flange of the tower section and the upper flange of the other tower section are arranged in abutment with each other, and a plurality of stud bolts are each positioned with the elongated shaft extending through a pair of aligned bolt holes formed in the two abutting flanges.

Next, a nut is mounted on a lower part of each of the stud bolts. Accordingly, each stud bolt is now provided with two nuts, one arranged above the abutting flanges and one arranged below the abutting flanges.

Finally, the stud bolts are tensioned, thereby securing the tower section to the other tower section, via the flange combination. The stud bolts may be tensioned either by coupling a bolt tensioner to a free end of the stud bolt for stretching the stud bolt. Alternatively, a torque tool may be coupled to the nut for rotating the nut until a desired torque level is achieved corresponding to a desired bolt tension. Since nuts are arranged above the abutting flanges as well as below the abutting flanges, the bolts can be tensioned from above as well as from below the flange combination. Thus, the operation of having to retrieve the bolts from the bolt holes and reinsert them in the bolt holes from below can be avoided. Thereby the amount of work which needs to be performed at the elevated mounting level is considerably reduced, and a significant amount of handling of the heavy tower bolts is avoided. Furthermore, this is achieved while allowing the bolts to be lifted to the mounting position along with the tower section, thereby minimising the required number of lifts. Thus, significantly less manual handling is required, and the time required for erecting the tower is reduced, thereby reducing the costs of erecting the tower.

The step of mounting a nut on a lower part of each of the stud bolts may comprise the steps of:
  mounting a socket tool on an end part of one of the stud bolts,
  adjusting a position of the stud bolt relative to the flange combination, using the socket tool, such that a predetermined portion of the stud bolt is positioned above the lower flange, and
  mounting a nut on the lower part of the stud bolt and moving the nut into abutment with the upper flange of the other tower section.

According to this embodiment, the position of the stud bolt relative to the abutting flanges is adjusted before the stud bolts are tensioned. Thereby it is ensured that the stud bolt and the nuts are positioned relative to the abutting flanges in a manner which allows proper tensioning of the stud bolts using a tensioning tool.

The adjustment of the position of the stud bolt is performed using a socket tool which is mounted on an end part of one of the stud bolts, preferably an end part which is positioned above the flange combination. The position of the stud bolt is adjusted until a predetermined portion of the stud bolt is positioned above the lower flange, thereby ensuring appropriate positioning of the stud bolt relative to the flange combination. Adjusting the position of the stud bolt by means of such a socket tool allows precise adjustment of the stud bolt to be obtained in an easy manner.

Furthermore, a nut is mounted on the lower part of the stud bolt, and this nut is moved into abutment with the upper flange of the other tower section. Each of the two nuts being mounted on the stud bolt is thereby arranged in abutment with one of the flanges forming the flange combination, and the stud bolt is ready to be tensioned by rotating one or both of the nuts.

The step of adjusting the position of the stud bolt may be performed before mounting the nut on the lower part of the stud bolt. Alternatively, the nut may be mounted on the lower part of the stud bolt before the position of the stud bolt is adjusted, as long as the nut is mounted in such a manner that it is possible to appropriately adjust the position of the stud bolt relative to the flange combination, i.e. the nut should not be positioned in abutment with the upper flange of the other tower section before the step of adjusting the position of the stud bolt is performed.

The socket tool may comprise a bolt engaging part comprising a body having an inner cavity arranged to receive an end part of a stud bolt, a stud bolt engaging arrangement configured for positively engaging the stud bolt and transferring movements of a tool to the stud bolt, and a length adjuster configured for adjusting a free length of the end part of the stud bolt, and the step of adjusting a position of the stud bolt may be performed by operating the length adjuster.

According to this embodiment, the socket tool is mounted on the end part of the stud bolt in such a manner that the end part is received in the inner cavity of the body of the socket tool, and in such a manner that the stud bolt engaging arrangement engages the stud bolt. This could, e.g., include arranging a threaded portion of the socket tool in threaded connection with a threaded portion of the stud bolt. Movements of a tool is then transferred to the stud bolt via the stud bolt engaging arrangement, e.g. by means of a threaded connection as described above. Thereby the position of the stud bolt relative to the flange combination is adjusted, while the precise position of the stud bolt is controlled by means of the length adjuster.

Thus, the inner cavity of the body of the socket tool may be provided with an inner thread corresponding to a threaded portion of the stud bolt and with an end portion at an open end of the inner cavity, the length adjuster of the socket tool may comprise an inner part arranged in a portion of the inner cavity and being provided with an outer thread being arranged in threaded engagement with the inner thread of the inner cavity, the inner part being provided with an end portion, and the step of adjusting a position of the stud bolt may comprise operating the length adjuster until the end portion of the body abuts a nut arranged on the upper part of the stud bolt and the end portion of the inner part abuts an upper end of the stud bolt.

According to this embodiment, the inner thread of the cavity is arranged in threaded engagement with the thread of the end part of the stud bolt. Furthermore, the inner part of the length adjuster is arranged in the inner cavity, also in threaded engagement with the inner thread. The length adjuster is then operated in such a manner that relative movement between the stud bolt and the body of the socket tool takes place until the end portion of the body abuts the nut arranged on the upper part of the stud bolt and the end portion of the inner part abuts an upper end of the stud bolt. Thereby the portion of the stud bolt which extends above the nut corresponds exactly to a fixed distance between the end portion of the body and the end portion of the inner part mounted inside the inner cavity. Accordingly, precise positioning of the stud bolt relative to the nut, and thereby relative to the flange which the nut abuts, is obtained in an easy manner.

The stud bolt engaging arrangement of the socket tool may comprise a tool engaging part, and the step of operating the length adjuster may comprise operating a driving tool engaging the tool engaging part. According to this embodiment, a separate driving tool, e.g. a rotating driving tool, is applied to the tool engaging part of the socket, and movements of the driving tool are then transferred to the stud bolt via the stud bolt engaging arrangement when the driving tool is operated, thereby operating the length adjuster, e.g. as described above.

The method may further comprise the step of removing the socket tool from the upper part of the stud bolt. Subsequently, the socket tool may be mounted on an end part of one of the other stud bolts, and the steps described above may be repeated in order to adjust the position of that stud bolt relative to the flange combination. This may be repeated until the positions of all of the stud bolts have been adjusted.

The step of removing the socket tool from the upper part of the stud bolt could, e.g., include rotating the socket tool out of engagement with the threaded portion of the stud bolt.

In the case that the socket tool comprises a body and an inner part connected to each other via respective threads, as described above, the body may be provided with grooves having corresponding protruding parts of the inner part arranged therein. Thereby the inner part may perform rotational movements relative to the body along a restricted angular interval, which is defined by the dimensions of the grooves. This may have the following effect. When the end portion at the open end of the inner cavity is moved into abutment with the nut, thereby completing the adjustment of the position of the stud bolt, the body is prevented from further rotation. Then the direction of rotation is reversed. Accordingly, the inner part will rotate relative to the body along the restricted angular interval. This is sufficient to move the inner part slightly backwards so that there is no longer direct contact between the inner part and the end of the stud bolt. The socket tool is removed from the stud bolt by continuing the rotation in the reverse direction as the body rotates relative to the threads of the stud bolt. Accordingly, adjustment of all the stud bolts can be performed quickly and reliably.

The step of positioning stud bolts in the plurality of bolt holes in the lower flange may be performed using a bolt gripping tool. According to this embodiment, handling of the stud bolts on the ground is assisted by the bolt gripping tool, rather than being performed in a purely manual manner.

The bolt gripping tool may comprise a gripping portion arranged to grip a stud bolt and a moving portion arranged to move the gripping portion, and the step of positioning the stud bolts in the plurality of bolt holes may comprise the steps of:
  moving the gripping portion to a position of a stud bolt by means of the moving portion,
  gripping the stud bolt by means of the gripping portion,
  moving the gripping portion and the stud bolt to a bolt hole by means of the moving portion,
  positioning the stud bolt in the bolt hole, and
  releasing the stud bolt from the gripping portion.

According to this embodiment, the stud bolts are gripped by means of the gripping portion and moved into position by moving the gripping portion, holding the stud bolts, by means of the moving portion.

The step of gripping the stud bolt by means of the gripping portion may be performed by means of a magnet forming part of the gripping portion. According to this embodiment, the gripping portion is provided with a magnet which interacts with the stud bolt being made from a magnetisable material, such as iron or steel, in order to retain the stud bolt in the gripping portion during movement. This is a very easy manner of retaining the stud bolt.

The magnet may preferably be an electromagnet in order to allow the stud bolts to be easily released from the gripping portion without risking that they unintentionally fall off during movement of the gripping portion and stud bolt.

As an alternative, the gripping portion may be provided with a threaded portion arranged to engage a threaded portion formed on the stud bolt. As another alternative, the gripping portion may be configured to grip the stud bolt by means of air suction. In this case the gripping portion may be provided with a number of air openings connected to a suction apparatus, and gripping or release of a stud bolt may be obtained by switching the suction apparatus on or off. As another alternative, the stud bolts may be gripped by the gripping portion in any other suitable manner.

The steps of moving the gripping portion may comprise lifting and/or swinging the gripping portion. For instance, the gripping portion may be arranged at one end of an arm which may be capable of performing swinging movements and/or lifting movements. In the case that the movement of the gripping portion includes lifting as well as swinging, it is possible to move the gripping portion, and thereby a stud bolt being held by the gripping portion, in three dimensions, and between any two given positions.

Alternatively or additionally, the steps of moving the gripping portion may comprise moving the gripping portion in a translational manner.

The step of orienting the tower section in an upright position may comprise positioning the tower section on at least two tower supports, thereby arranging the lower flange at a level above the ground. Thereby the stud bolts being subsequently positioned in the bolt holes of the lower flange can extend below the lower flange without touching the ground. Accordingly, the stud bolts will be hanging freely in the bolt holes, retained only by the nut abutting the lower flange in the manner described above.

The step of tensioning the stud bolts may be performed using a hydraulic tensioning tool. Thereby a predefined tension can easily be applied to each of the stud bolts. Alternatively, the stud bolts may be tensioned in any other suitable manner, e.g. by means of an electrically driven tensioning tool or manually.

According to a second aspect the invention provides a socket tool for screwing threaded nuts onto stud bolts, the socket tool comprising:
  a body formed with an inner cavity arranged to receive therein an end part of a stud bolt,
  a stud bolt engaging arrangement configured for positively engaging the stud bolt and transferring torque from a drive tool to the stud bolt, and
  a length adjuster configured for adjusting a free length of the end part of the stud bolt.

It should be noted that a person skilled in the art would readily recognise that any feature described in combination with the first aspect of the invention could also be combined with the second aspect of the invention, and vice versa.

Accordingly, the remarks set forth above with reference to the first aspect of the invention are equally applicable here.

The socket tool according to the second aspect of the invention may, e.g., be used for mounting nuts on stud bolts as part of the method according to the first aspect of the invention.

The socket tool comprises a body formed with an inner cavity arranged to receive an end part of a stud bolt. The inner cavity may, e.g., be provided with an inner thread arranged to engage an outer thread formed on a stud bolt. This has been described above with reference to the first aspect of the invention.

The socket tool further comprises a stud bolt engaging arrangement configured for positively engaging the stud bolt and transferring torque from a drive tool to the stud bolt. Thereby a stud bolt having the socket tool mounted thereon can be rotated by operating a drive tool and transferring torque from the drive tool to the stud bolt via the stud bolt engaging arrangement.

The torque transferred by the stud bolt engaging arrangement to the stud bolt rotates the stud bolt such that a nut being held stationary at an end opposite the socket tool can be mounted onto the stud bolt.

Most common are stud bolts with right-handed threads. In this case the direction of the torque transferred by the stud bolt engaging arrangement is clockwise to mount the nut. The torque transfer is effected by clockwise rotation of the socket tool.

In order to release the stud bolt engaging arrangement in the above example, the socket tool is rotated counter clockwise. The stud bolt engaging arrangement is configured to release engagement with the stud bolt in order to free the socket tool. I.e. the friction between the stud bolt engaging arrangement shall be so low that the stud bolt remain in place such that the free length of the end part of the stud bolt adjusted by the length adjuster is maintained.

For a left-handed thread the opposite applies.

Finally, the socket tool comprises a length adjuster configured for adjusting a free length of the end part of the stud bolt. Accordingly, a position of the stud bolt relative to another component, e.g. a flange combination as described above with reference to the first aspect of the invention, can be adjusted by means of the socket tool. Thus, the position of the stud bolt can be adjusted very accurately in an easy manner.

The inner cavity of the body may be provided with an inner thread corresponding to a threaded portion of the stud bolt. Thereby the socket tool can be connected to the end part of the stud bolt via a threaded connection between the inner thread of the cavity and an outer thread formed on the end part of the stud bolt.

The length adjuster may comprise:
 an inner part arranged in a portion of the inner cavity and being provided with an outer thread being arranged in threaded engagement with the inner thread of the inner cavity, the inner part being provided with an end portion.

According to this embodiment, the end portion of the inner part may be arranged in abutment with an end of the stud bolt during adjustment of the free length of the end part of the stud bolt, and thereby the position of the end portion of the inner part is used for defining the free length of the end part of the stud bolt.

The body may be provided with an end portion at an open end of the inner cavity, and the end portion of the inner part may be arranged inside the inner cavity at a distance from the end portion of the body.

According to this embodiment, the free length of the end part of the stud bolt may be adjusted to a length defined by the distance between the end portion of the inner cavity and the end portion of the inner part. Thereby the free length of the end part of the stud bolt can be adjusted very precisely.

The inner thread of the body may extend over only a part of an inner surface of the inner cavity, and the part of the inner surface of the inner cavity without the inner thread may be arranged in a region adjacent to the end portion of the body.

According to this embodiment, the part of the cavity which is arranged closest to the end portion of the body can be mounted on the end part of the stud bolt in a sliding movement. Introducing the end part of the stud bolt further into the cavity requires forming a threaded connection between the threads formed in the inner cavity and the stud bolt, respectively.

Allowing the first part of the mounting movement to performed by sliding, the mounting is performed fast. For instance, the number of required rotations before the inner part abuts the end part of the stud bolt is reduced as compared to a situation where the threaded portion of the cavity extends to the end portion of the body.

Furthermore, the threaded connection between the cavity and the inner part introduces friction, and the friction increases as the length of the threaded connection increases. This may cause the stud bolt to rotate, thereby adjusting the position of the stud bolt, before the inner part abuts the end part of the stud bolt. This may result in incorrect or unprecise adjustment of the position of the stud bolt. Therefore the length of the threaded connection should only be sufficient to establish a good connection between the stud bolt and the socket tool.

The stud bolt engaging arrangement may comprise a tool engaging part. Thereby a drive tool can be arranged at the tool engaging part. When the tool is operated, torque is transferred from the drive tool to the stud bolt via the stud bolt engaging arrangement. The tool engaging part may, e.g., be formed on the inner part.

BRIEF DESCRIPTION OF THE DRAWINGS

The invention will now be described in further detail with reference to the accompanying drawings in which.

DETAILED DESCRIPTION OF THE DRAWINGS

FIGS. 1-14 illustrate a method for erecting a wind turbine tower in accordance with an embodiment of the invention.

Figure 1:
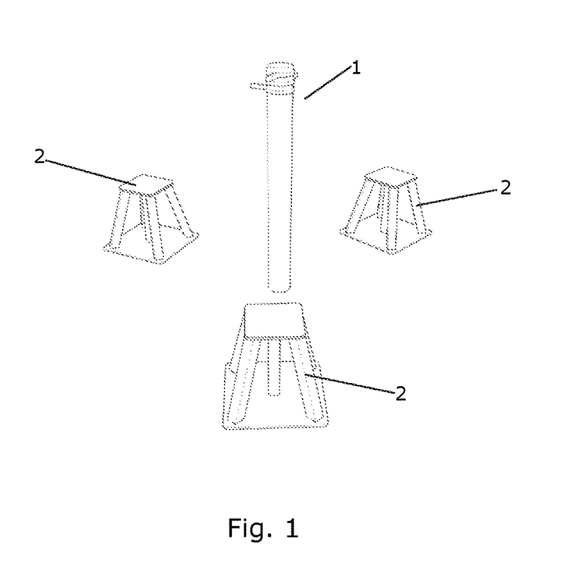
FIGS. 1-14 illustrate a method for erecting a wind turbine tower in accordance with an embodiment of the invention.

In FIG. 1 a bolt gripping tool 1 and three tower supports 2 have been positioned at a site where the wind turbine tower is being erected.

Figure 2:
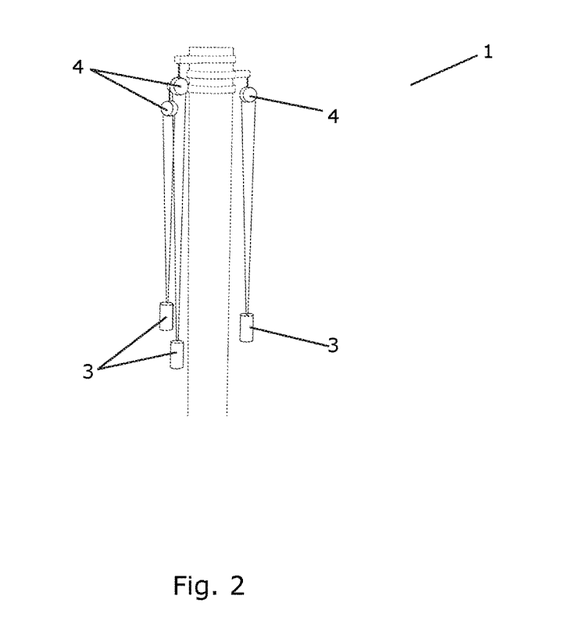

FIG. 2 shows the bolt gripping tool 1 in more detail. It can be seen that the bolt gripping tool 1 comprises three gripping portions 3, in the form of magnets, and three moving portions 4, in the form of electrical cable winches. Each gripping portion 3 is connected to a separate moving portion 4, thereby allowing each gripping portion 3 to be moved independently of any of the other gripping portions 3.

Figure 3:
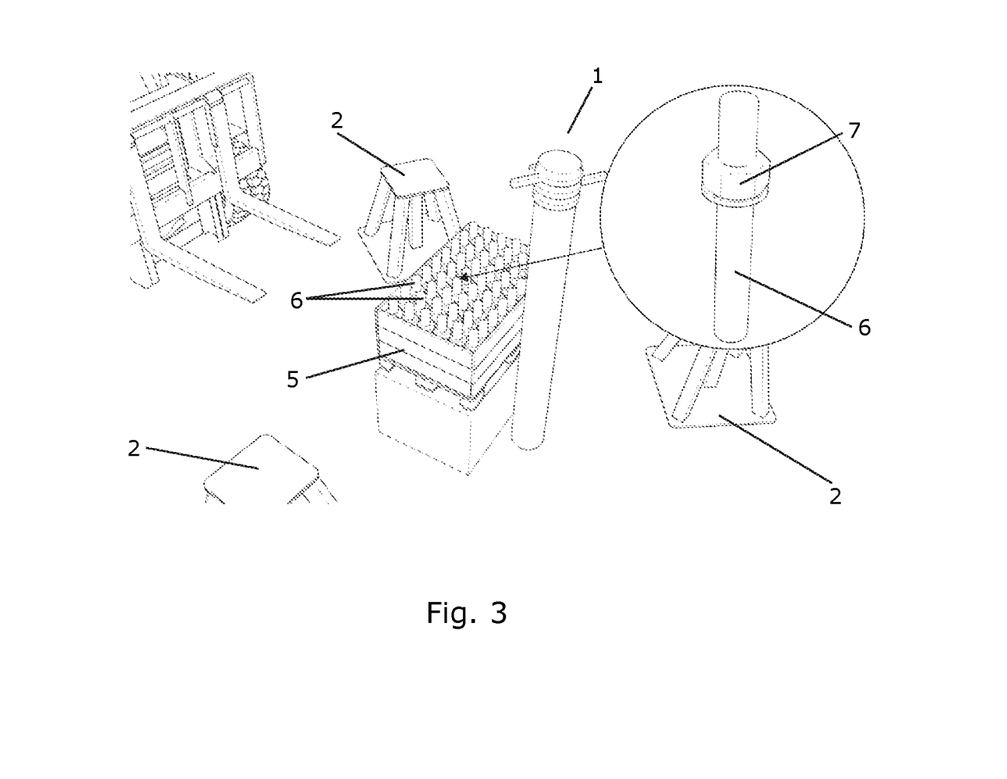

In FIG. 3 a container 5 with a plurality of stud bolts 6 has been positioned next to the bolt gripping tool 1. A nut 7 is mounted to an end of each of the stud bolts 6.

Figure 4:
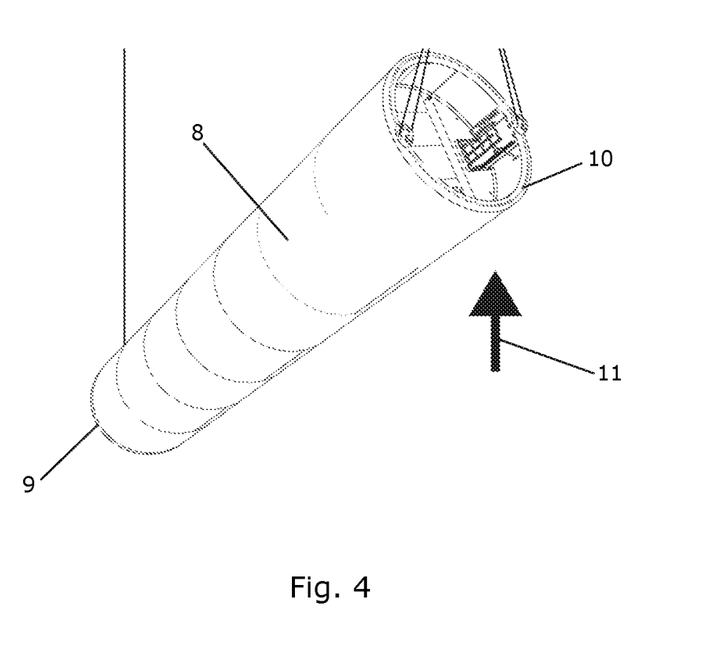

In FIG. 4 a tower section 8 is in the process of being oriented in an upright position. The tower section 8 comprises a lower flange 9 and an upper flange 10, arranged at opposing ends of the tower section 8. Prior to the movement of the tower section 8 which is illustrated in FIG. 4, the tower section 8 will normally be lying on the ground with its longitudinal axis arranged parallel to the ground, i.e. along a substantially horizontal direction. The movement towards the upright position is then performed by elevating the part of the tower section 8 which contains the upper flange 10, as illustrated by arrow 11. When this movement has been completed, the tower section 8 will be in the upright position, i.e. the longitudinal direction of the tower section 8 will be arranged in a substantially vertical direction, with the lower flange 9 arranged below the upper flange 10.

Figure 5:
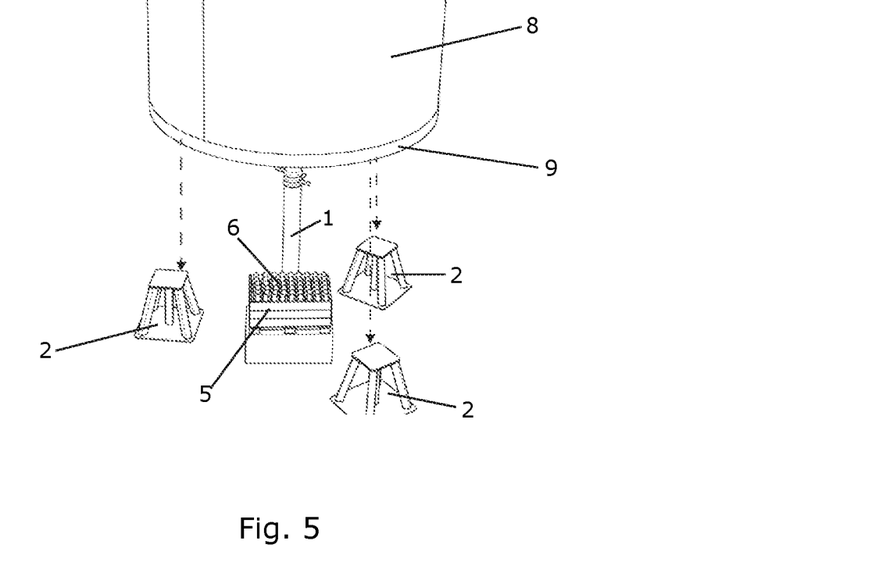

In FIG. 5 the tower section 8 has been oriented in the upright position, and is in the process of being lowered onto the three tower supports 2. When this movement has been completed, the lower flange 9 of the tower section 8 will rest on the three tower supports 2.

The tower section 8 is further being positioned in such a manner that the bolt gripping tool 1 and the container 5 with stud bolts 6 are arranged inside the tower section 8, i.e. within the wall of the tower section 8.

Figure 6:
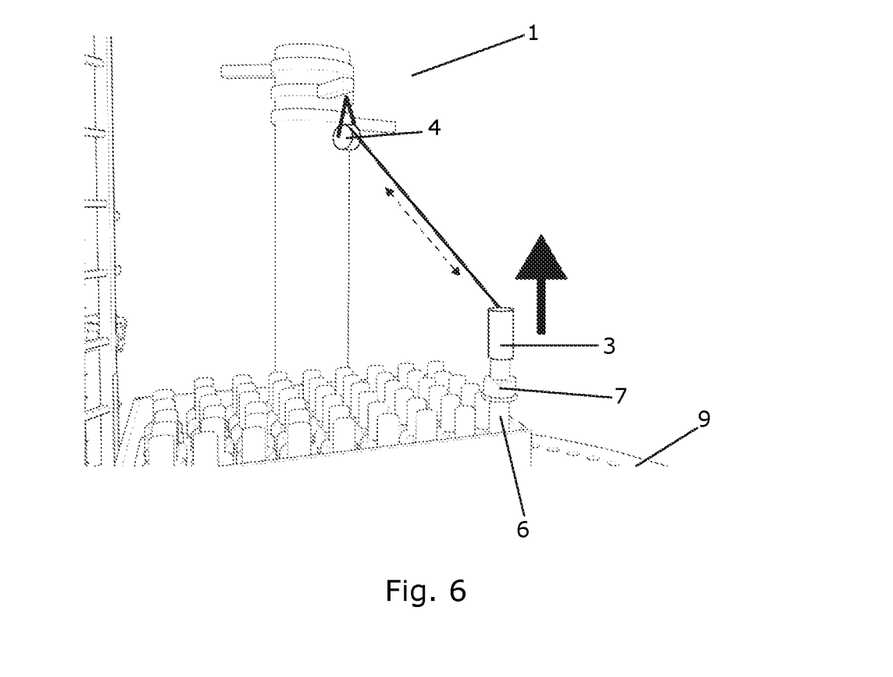

FIG. 6 illustrates that a stud bolt 6 from the container 5, with a nut 7 mounted thereon, has been gripped by a gripping portion 3 of the bolt gripping tool 1, and is in the process of being moved away from the container 5 by operation of a moving portion 4 of the bolt gripping tool 1. It can be seen that the bolt gripping tool 1 is arranged next to the lower flange 9 of the tower section.

Figure 7:
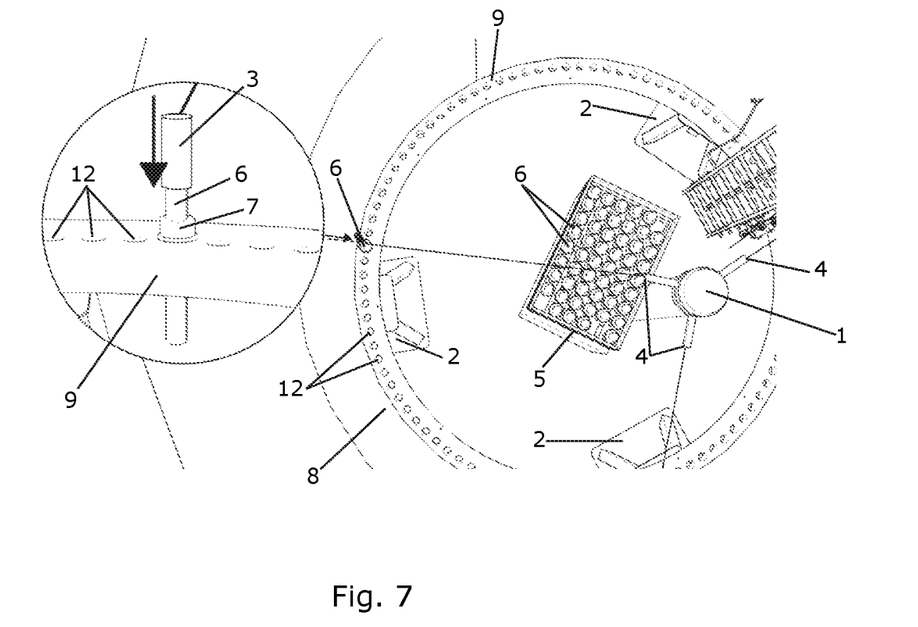

FIG. 7 is a view from above illustrating that stud bolts 6 are being gripped by means of the gripping portions 3 of the gripping tool 1 and moved by means of the moving portions 4 of the gripping tool 1 from the container 5 to through-going bolt holes 12 formed in the lower flange 9 of the tower section 8. The use of the bolt gripping tool 1 for this purpose minimises the amount of manual work required. It can be seen from the insert that the stud bolts 6 are positioned in the through-going bolt holes 12 of the lower flange 9 in such a manner that the nuts 7 is arranged above the lower flange 9, and thereby rest on the lower flange 9. Accordingly, the nuts 7 prevent the stud bolts 6 from passing all the way through the through-going bolt holes 12, i.e. they retain the stud bolts 6 relative to the lower flange 9.

Figure 8:
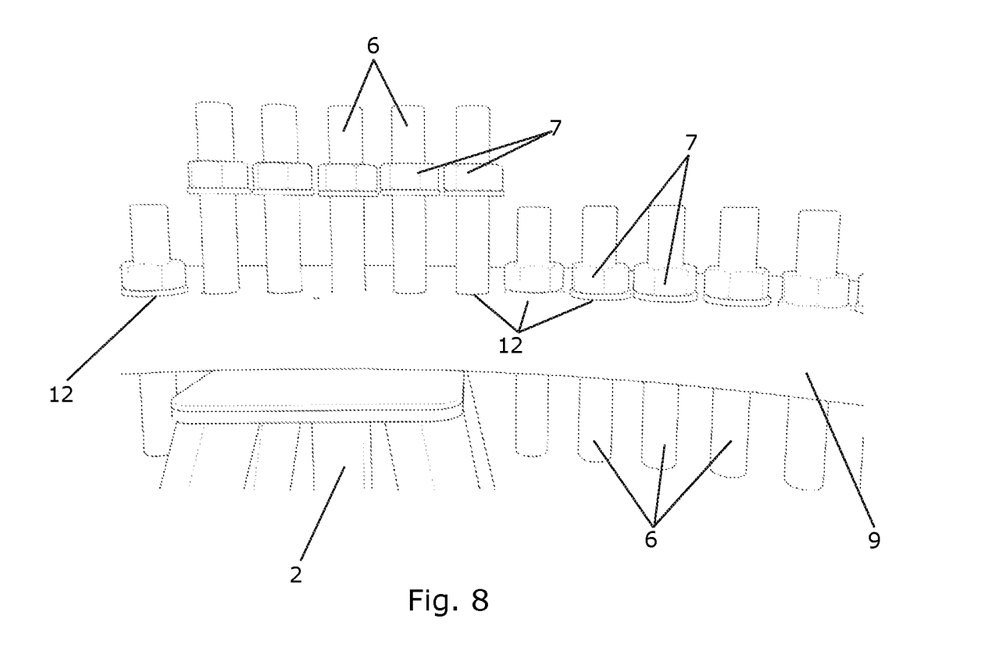

FIG. 8 shows a portion of the lower flange 9 with stud bolts 6 arranged in each of the through-going bolt holes 12. It can be seen that the stud bolts 6 arranged in the through-going bolt holes 12 formed in a region of the lower flange 9 which rests on a tower support 2 have not been advanced through the through-going bolt holes 12 to the extent that the nuts 7 rest on the lower flange 9. Instead the ends of these stud bolts 6 rest on the tower support 2.

Figure 9:
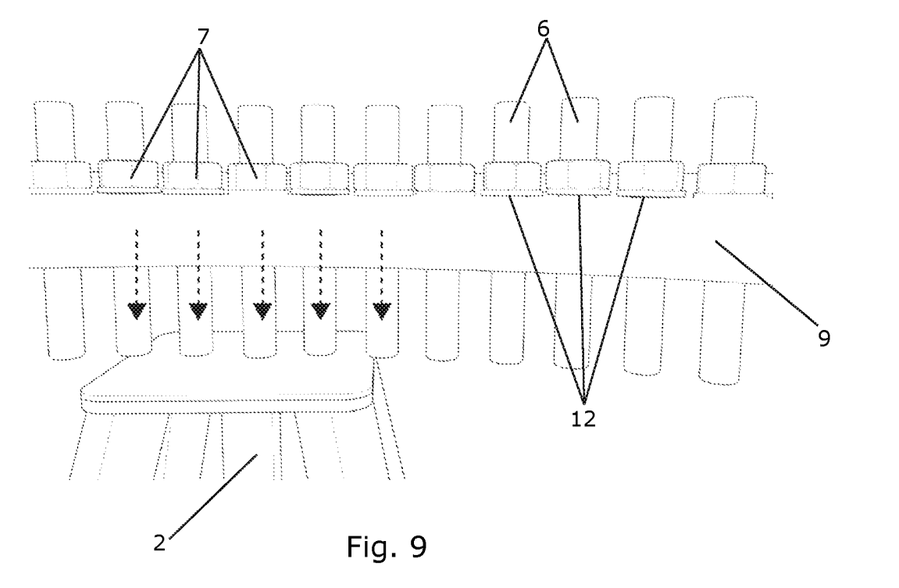

In FIG. 9 the tower section has been lifted clear of the tower supports 2. Thereby the stud bolts 6 which previously rested on the tower support 2, as illustrated in FIG. 8, have advanced further through the respective through-going bolt holes 12 to the extent that the nuts 7 now rest on the lower flange 9.

Figure 10:
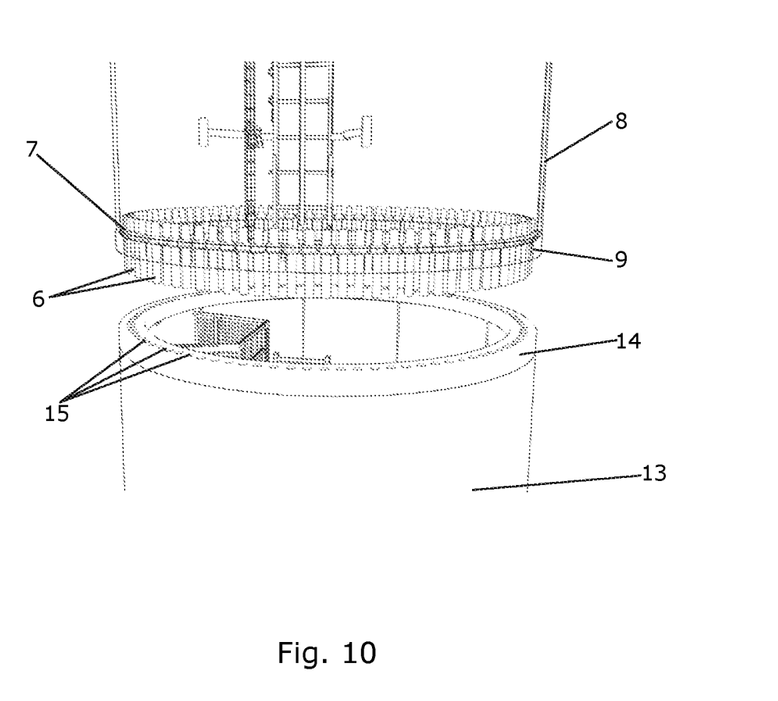

In FIG. 10 the tower section 8 has been lifted to a position immediately above another tower section 13. The stud bolts 6 positioned in each of the through-going bolt holes 12 of the lower flange 9 of the tower section 8 have been lifted along with the tower section 8. Accordingly, the tower section 8 and all bolts 6 required for mounting the tower section 8 on the other tower section 13 are lifted to the mounting position in a single lifting operation.

The tower section 8 is in the process of being lowered towards a mounting position on the other tower section 13 in order to arrange the lower flange 9 of the tower section 8 in abutment with an upper flange 14 of the other tower section 13. The upper flange 14 of the other tower section 13 is also provided with a plurality of through-going bolt holes 15. As the tower section 8 is lowered towards the other tower section 13, the stud bolts 6, which are already arranged in the through-going bolt holes 12 of the tower section 8, are advanced through the through-going bolt holes 15 of the upper flange 14 of the other tower section 13. Thereby a flange combination is formed.

Figure 11:
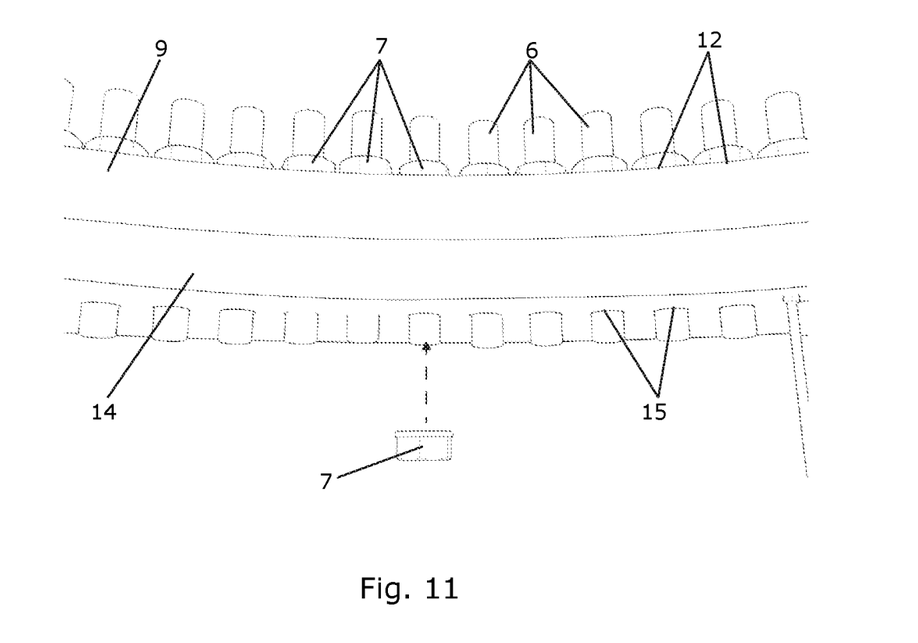

FIG. 11 shows a part of the flange combination formed in the manner described above. It can be seen that the lower flange 9 of the tower section and the upper flange 14 of the other tower section are arranged in abutment with each other, and that each of the stud bolts 6 extends through a pair of through-going bolt holes 12, 15 formed in the lower flange 9 of the tower section and the upper flange 14 of the other tower section, respectively, and with the respective nuts 7 resting on the lower flange 9 of the tower section, i.e. the nuts 7 are arranged above the flange combination, and they retain the stud bolts 6 relative to the lower flange 9 of the tower section, and thereby relative to the flange combination.

A nut 7 is in the process of being mounted on a lower part of one of the stud bolts 6. This nut 7 is arranged below the upper flange 14 of the other tower section, and thereby below the flange combination.

Figure 12:
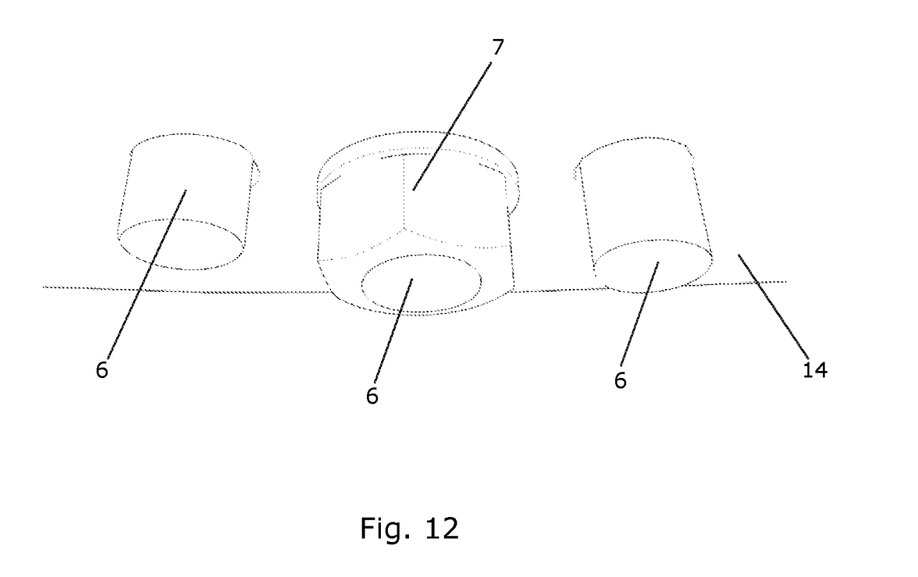

FIG. 12 shows the nut 7 in position on the lower part of the stud bolt 6.

Figure 13:
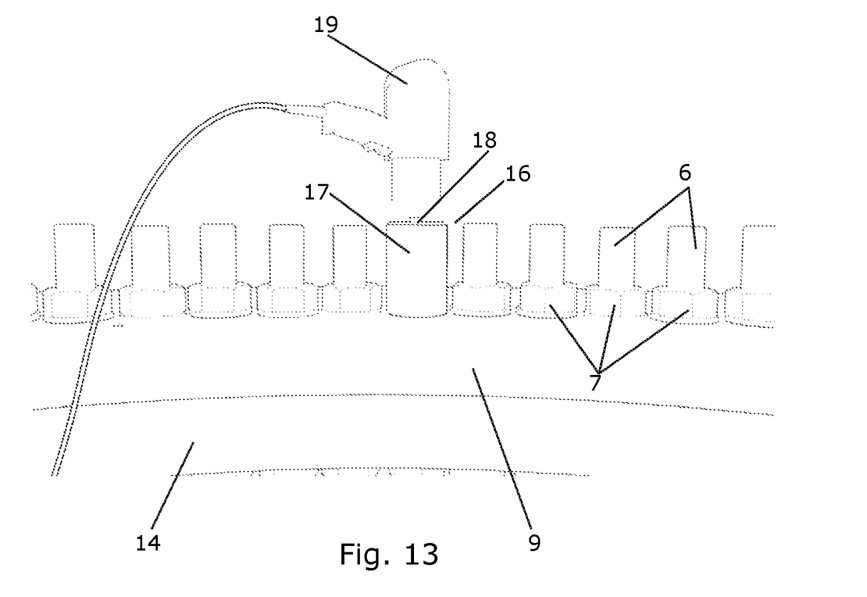

FIG. 13 illustrates adjustment of the position of one of the stud bolts 6 relative to the flange combination, using a socket tool 16 according to an embodiment according to the invention. The socket tool 16 comprises a body 17 formed with an inner cavity (not visible) in which a part of a stud bolt 6 can be received. The socket tool 16 is further provided with a tool engaging portion 18 in which a driving tool 19 is arranged. Operating the driving tool 19 causes the position of the stud bolt 6 relative to the flange combination to be adjusted in a manner which will be described in further detail below with reference to FIGS. 15 and 16.

As a result, the stud bolt 6 will be positioned relative to the flange combination in such a manner that the upper end of the stud bolt 6 is arranged with a specified distance to the lower flange 9 of the tower section. Subsequently, the socket tool 16 and the driving tool 19 may advantageously be moved to one of the other stud bolts 6 in order to adjust the position of that stud bolt 6 relative to the flange combination. This may be repeated until the position of each of the stud bolts 6 has been adjusted.

When the position of a given stud bolt 6 has been adjusted as described above, the nut 7 mounted on the lower part of the stud bolt 6 may advantageously be moved into abutment with the upper flange 14 of the other tower section.

Figure 14:
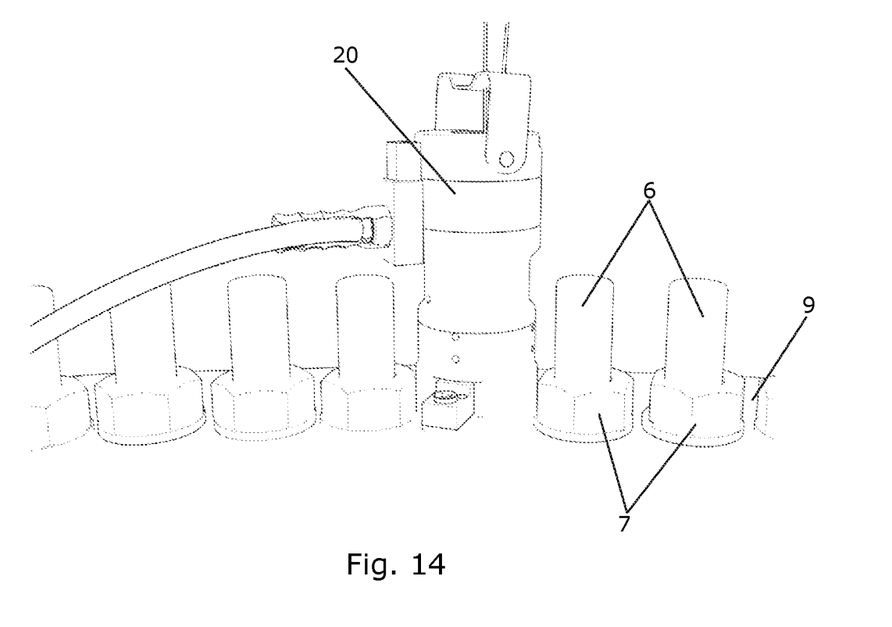

FIG. 14 shows tensioning of one of the stud bolts 6 by rotating the nut 7 mounted thereon, using a hydraulic tensioning tool 20.

Figure 15:
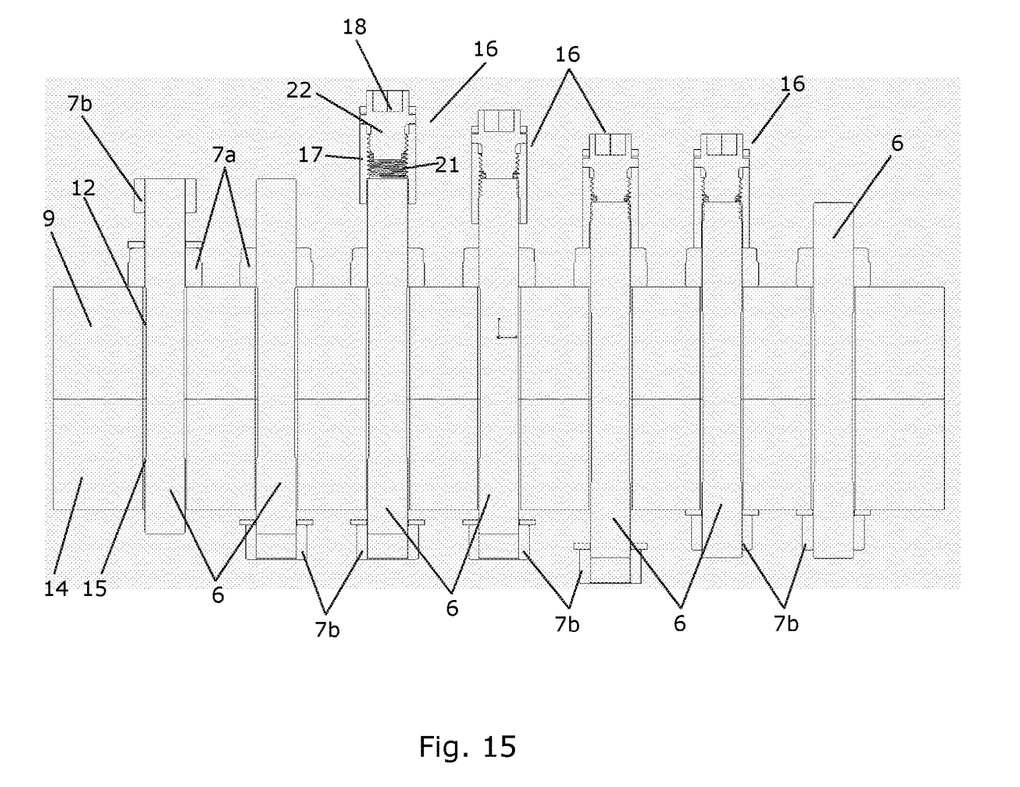
FIGS. 15 and 16 illustrate adjusting of a position of a stud bolt relative to a flange connection, using a socket tool according to an embodiment of the invention.
Figure 16:
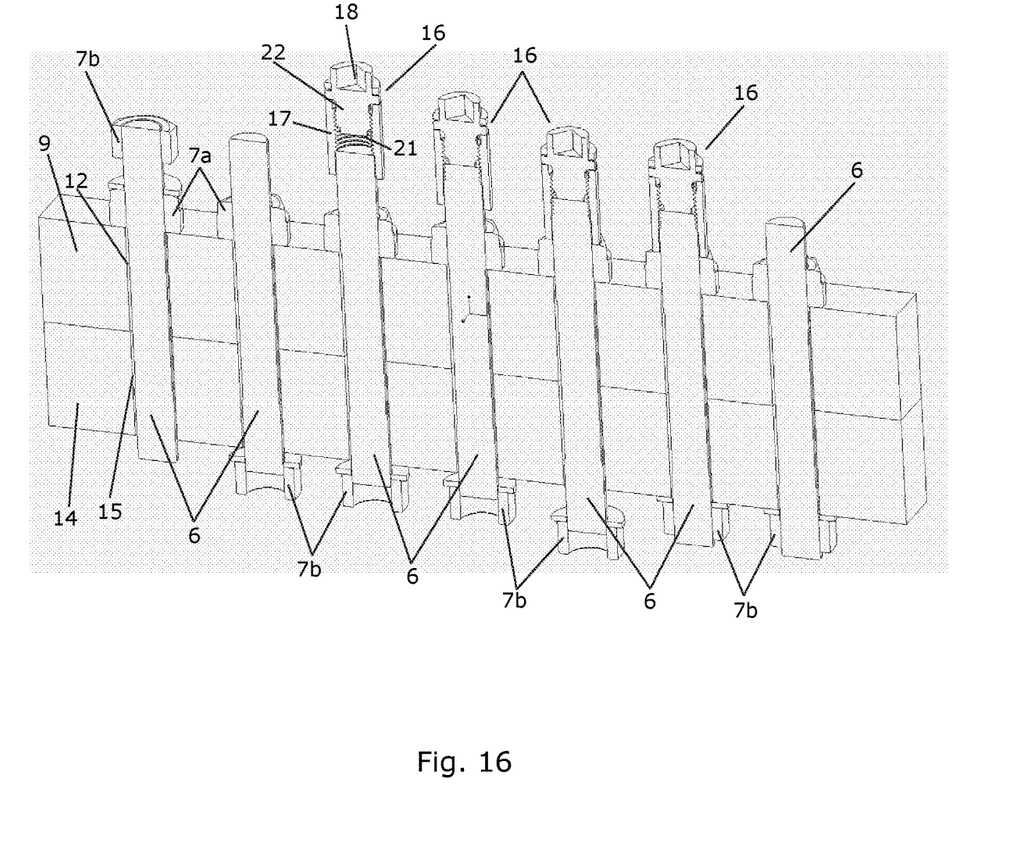

FIGS. 15 and 16 illustrate various steps during adjustment of the position of a stud bolt 6 relative to a flange combination, using a socket tool 16 according to an embodiment of the invention. Each of the illustrated stud bolts 6 represents a step of the process, in a sequence from left to right.

FIG. 15 is a cross sectional view of the flange combination and the stud bolts 6, and FIG. 16 is a perspective cross sectional view.

Initially, the stud bolt 6, with a nut 7a mounted thereon, is arranged in the through-going bolt holes 12, 15 formed in the lower flange 9 of the tower section and the upper flange 14 of the other tower section, respectively, in the manner described above with reference to FIGS. 1-14. Accordingly, the nut 7a rests on the lower flange 9 of the tower section. Furthermore, an additional nut 7b is mounted above the nut 7a which rests on the lower flange 9. This nut 7b will be mounted on the lower part of the stud bolt 6 at a later point in time, but mounting it on the upper part of the stud bolt 6 as illustrated allows it to be lifted to the mounting position along with the tower section and the stud bolts 6, in the manner described above, i.e. a separate lifting operation for lifting the additional nuts 7b to the mounting position is not required.

Thus, in the next step the nut 7b has been removed from the upper part of the stud bolt 6 and has instead been mounted on the lower part of the stud bolt 6. The nut 7b has been mounted in such a manner that it is not arranged in abutment with the upper flange 14 of the other tower section, thereby allowing the stud bolt 6 to move in an upwards direction if this is required.

In the next step a socket tool 16 has been mounted on the upper end of the stud bolt 6. The socket tool 16 comprises a body 17 with an inner cavity 21. The inner cavity 21 has a threaded portion and an unthreaded portion, arranged adjacent to an open end of the inner cavity 21. The socket tool 16 has been mounted on the stud bolt 6 by sliding the unthreaded portion of the inner cavity 21 onto the upper end of the stud bolt 6.

The socket tool 16 further comprises an inner part 22 with an outer thread. The inner part 22 is arranged inside the inner cavity 21 in such a manner that the outer thread of the inner part 22 is arranged in threaded engagement with the threaded portion of the inner cavity 21. The inner part 22 is further provide with a tool engaging part 18 arranged to receive a tool, e.g. as illustrated in FIG. 13.

In the next step the socket tool 16 has been advanced further onto the stud bolt 6. This is obtained by rotating the inner part 22 by operating a driving tool (not shown) mounted on the tool engaging part 18. Due to the threaded connected between the inner part 22 and the inner cavity 21, this causes the body 17 to rotate, thereby forming a threaded connection between the threaded portion of the inner cavity 21 and the outer thread of the stud bolt 6. Accordingly, the socket tool 16 is screwed onto the upper end of the stud bolt 6, until the end of the inner part 22 abuts the end of the stud bolt 6, as shown.

In the next step rotation of the inner part 22 as described above is continued. However, since the end of the inner part 22 now abuts the upper end of the stud bolt 6, this causes the stud bolt 6 to be moved in a downwards direction, due to the threaded connection between the threaded portion of the inner cavity 21 and the stud bolt 6. This continues until the socket tool 16 abuts the nut 7a. At this point in time the upper end of the stud bolt 6 is arranged at a specific distance above the lower flange 9 of the tower section. This specific distance is defined by the distance between the end of the inner part 22 and the free end of the body 17, which is arranged in abutment with the nut 7a, and the size of the nut 7a. Accordingly, the position of the stud bolt 6 has been adjusted very precisely.

Furthermore, when the socket tool 16 has been moved into abutment with the nut 7a, the body 17 is prevented from rotating relative to the stud bolt 6.

In the next step the nut 7b is moved into abutment with the upper flange of the other tower section.

Finally, in the last step the socket tool 16 is removed from the stud bolt 6.

Reverse rotation of the inner part 22 causes the inner part 22 to rotate relative to the body 17 along a specified angular interval which is defined by grooves formed in the body 17, in which protruding parts formed on the inner part 22 are received. This will be described in further detail below with reference to FIGS. 17 and 18. This moves the inner part 22 slightly upwards relatively to the body 17, sufficiently to move the inner part 22 out of abutment with the stud bolt 6. Reverse rotation of the socket tool 16 continues until the socket tool is free of the stud bolt 6. Thereby the total time required for adjusting the position of all stud bolts 6 is minimised and the position is adjusted reliably.

Figure 17:
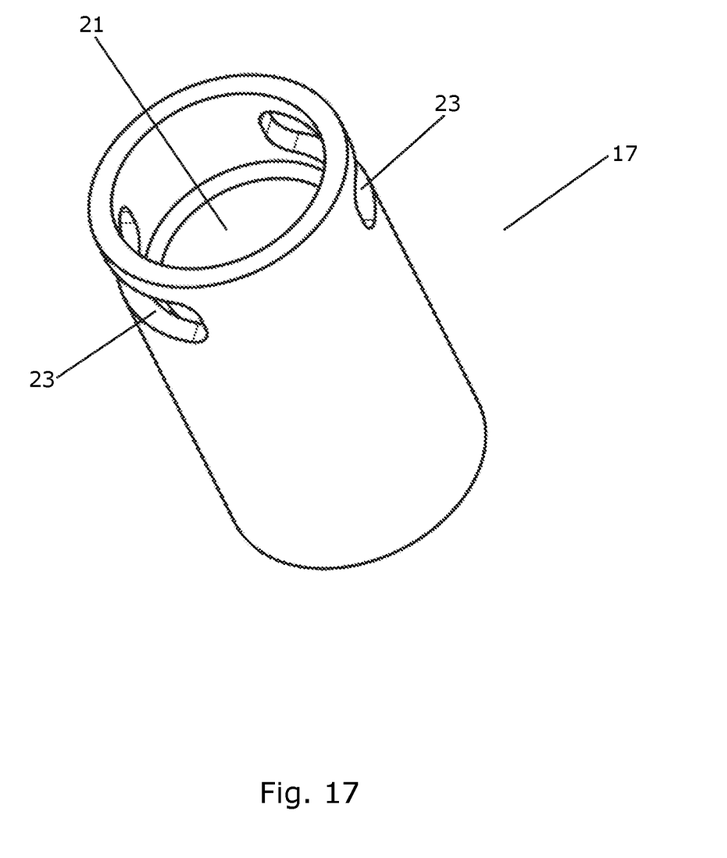
FIGS. 17 and 18 are perspective views of a body and an inner part, respectively, of a socket tool according to an embodiment of the invention.
Figure 18:
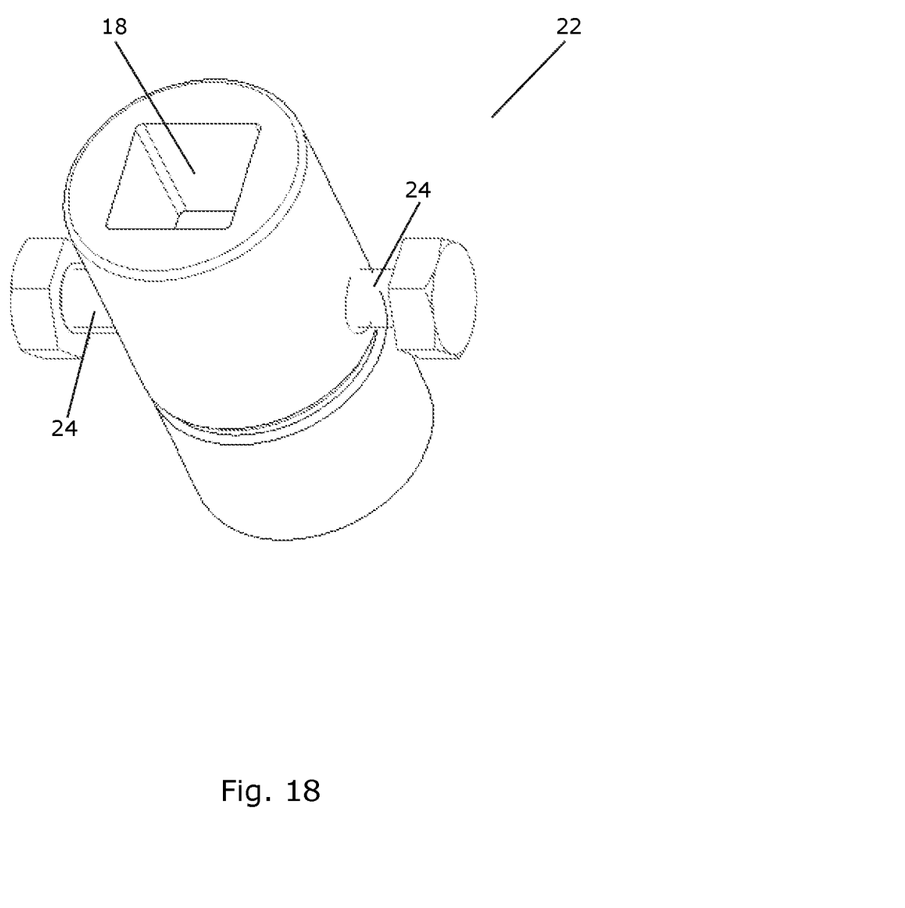

FIGS. 17 and 18 are perspective views of a body 17 and an inner part 22, respectively, of a socket tool according to an embodiment of the invention. The inner part 22 of FIG. 18 is configured to be inserted into the body 17 of FIG. 17, thereby forming a socket tool. The socket tool formed in this manner could, e.g., be the socket tool illustrated in FIGS. 15 and 16.

The body 17 of FIG. 17 has a cylindrical shape defining an inner cavity 21. The body 17 is further provided with two through-going grooves 23 formed in the cylindrical wall of the body 17. Each groove 23 extends over an angular distance of substantially 90° along the circumference of the body 17, and the two grooves 23 are arranged substantially opposite to each other.

The inner part 22 of FIG. 18 also has a cylindrical shape which is sized to fit inside the inner cavity 21 of the body 17 illustrated in FIG. 17. The inner part 22 is provided with a tool engaging part 18 and two protruding parts 24 which protrude outwards from the surface on opposite sides of the cylindrical inner part 22.

When the inner part 22 of FIG. 18 is arranged inside the inner cavity 21 of the body 17 of FIG. 17, each of the protruding parts 24 is received in one of the through-going grooves 23. Thereby the inner part 22 is allowed to rotate relative to the body 17 along an angular span defined by the grooves 23, i.e. approximately 90°, corresponding to the protruding parts 24 moving from one end of the respective groove 23 to the opposite end.

Clockwise or counter clockwise rotation or of the inner part 22 will cause a corresponding rotation of the body 17 when the two protruding parts 24 are in their extreme positions in the grooves 23, whereas the inner part 22 and the body 17 may rotate relative to each other between the extreme positions of the two protruding parts 24.

The invention claimed is:

1. A method for erecting a wind turbine tower, the method comprising the steps of:
   providing a tower section comprising a lower flange and an upper flange, each flange being provided with a plurality of through-going bolt holes,
   providing a plurality of stud bolts and a pair of nuts for each stud bolt of the plurality of stud bolts,
   mounting a nut of the pair of nuts to one end of each stud bolt,
   orienting the tower section in an upright position with the lower flange below the upper flange, positioning the plurality of stud bolts in the plurality of bolt holes in the lower flange with the nut of each stud bolt arranged on an upper side of the lower flange, lifting the tower section to a mounting position on top of another tower section, forming a flange combination by aligning the plurality of through-going bolt holes formed in the lower flange of the tower section with a plurality of through-going bolt holes formed in an upper flange of the another tower section, while advancing the plurality of stud bolts through the bolt holes of the tower section and the another tower section, mounting an other nut of the pair of nuts on a lower part of each of the stud bolts, mounting a socket tool on an end part of one of the stud bolts of the plurality of stud bolts, adjusting a position of the stud bolt relative to the flange combination, using the socket tool, such that a predetermined portion of the stud bolt is positioned above the lower flange, moving the other nut into abutment with the upper flange of the other tower section, and tensioning the stud bolts, thereby securing the tower section to the other tower section.

2. The method according to claim 1, wherein the socket tool comprises a bolt engaging part comprising a body having an inner cavity arranged to receive an end part of a stud bolt, a stud bolt engaging arrangement configured for positively engaging the stud bolt and transferring movements of a tool to the stud bolt, and a length adjuster configured for adjusting a free length of the end part of the stud bolt, and wherein the step of adjusting a position of the stud bolt is performed by operating the length adjuster.

3. The method according to claim 2, wherein the inner cavity of the body of the socket tool is provided with an inner thread corresponding to a threaded portion of the stud bolt and with an end portion at an open end of the inner cavity, wherein the length adjuster of the socket tool comprises an inner part arranged in a portion of the inner cavity and being provided with an outer thread being arranged in threaded engagement with the inner thread of the inner cavity, the inner part being provided with an end portion, and wherein the step of adjusting a position of the stud bolt comprises operating the length adjuster until the end portion of the body abuts a nut arranged on the upper part of the stud bolt and the end portion of the inner part abuts an upper end of the stud bolt.

4. The method according to claim 3, wherein the stud bolt engaging arrangement of the socket tool comprises a tool engaging part, and wherein the step of operating the length adjuster comprises operating a driving tool engaging the tool engaging part.

5. The method according to claim 1, further comprising the step of removing the socket tool from the end part of the stud bolt.

6. The method according to claim 1, wherein the step of positioning the plurality of stud bolts in the plurality of bolt holes in the lower flange is performed using a bolt gripping tool.

7. The method according to claim 6, wherein the bolt gripping tool comprises a gripping portion arranged to grip a stud bolt and a moving portion arranged to move the gripping portion, and wherein the step of positioning the plurality of stud bolts in the plurality of bolt holes comprises the steps of:

moving the gripping portion to a position of a stud bolt by means of the moving portion, gripping the stud bolt by means of the gripping portion, moving the gripping portion and the stud bolt to a bolt hole by means of the moving portion, positioning the stud bolt in the bolt hole, and releasing the stud bolt from the gripping portion.

8. The method according to claim 7, wherein the step of gripping the stud bolt by means of the gripping portion is performed by means of a magnet forming part of the gripping portion.

9. The method according to claim 7, wherein the steps of moving the gripping portion comprise lifting and/or swinging the gripping portion.

10. The method according to claim 1, wherein the step of orienting the tower section in an upright position comprises positioning the tower section on at least two tower supports, thereby arranging the lower flange at a level about the ground.

11. The method according to claim 1, wherein the step of tensioning the stud bolts is performed using a hydraulic tensioning tool.

12. The method according to claim 1, wherein the step of tensioning the stud bolts includes tensioning the stud bolts from above the lower flange of the tower section.

* * * * *